US011924243B2

(12) United States Patent
Shinomiya et al.

(10) Patent No.: US 11,924,243 B2
(45) Date of Patent: Mar. 5, 2024

(54) SEARCH DEVICE, SEARCH METHOD, AND SEARCH PROGRAM (71) Applicant: NIPPON TELEGRAPH AND TELEPHONE CORPORATION, Tokyo (JP)

(72) Inventors: Kazuma Shinomiya, Musashino (JP); Kazunori Kamiya, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 520 days.

(21) Appl. No.: 17/282,778

(22) PCT Filed: Sep. 26, 2019

(86) PCT No.: PCT/JP2019/037895
§ 371 (c)(1),
(2) Date: Apr. 5, 2021

(87) PCT Pub. No.: WO2020/075518
PCT Pub. Date: Apr. 16, 2020

(65) Prior Publication Data
US 2021/0392145 A1 Dec. 16, 2021

(30) Foreign Application Priority Data
Oct. 10, 2018 (JP) .................... 2018-192103

(51) Int. Cl.
*H04L 9/40* (2022.01)
(52) U.S. Cl.
CPC ........ *H04L 63/145* (2013.01); *H04L 63/1416* (2013.01)
(58) Field of Classification Search
CPC ................ H04L 63/145; H04L 63/1416
See application file for complete search history.

(56) References Cited

U.S. PATENT DOCUMENTS

| 8,302,191 B1 * | 10/2012 | Conrad | ................... G06F 21/56 726/22 |
| 2016/0366159 A1 * | 12/2016 | Chiba | ................. H04L 63/1458 |
| 2016/0381052 A1 * | 12/2016 | Yagi | .................... H04L 12/6418 707/769 |

FOREIGN PATENT DOCUMENTS

| JP | 2014229127 | * 12/2014 |
| JP | 2015179416 | * 10/2015 |
| JP | 2016146114 | *  8/2016 |

OTHER PUBLICATIONS

Nappa et al., "CyberProbe: Towards Internet-Scale Active Detection of Malicious Servers", Proceedings of NDSS, Feb. 2014, 15 pages.

* cited by examiner

*Primary Examiner* — Ayoub Alata
(74) *Attorney, Agent, or Firm* — XSENSUS LLP (57) ABSTRACT A search apparatus includes processing circuitry configured to extract fingerprints that are combinations of first communication data corresponding to requests and second communication data corresponding to responses to the requests, from communication data obtained by executing known malware, give degrees of priority corresponding to degrees of maliciousness of the malware, to the fingerprints, generate probes that are requests based on the first communication data included in the fingerprints and signatures based on the second communication data included in the fingerprints, decide, based on information about communication of sending-out destinations, search-target sending-out destinations from among the sending-out destinations, send out the probes generated to the search-target sending-out destinations decided in order according to the degrees of priority given, and determine whether the search-target sending-out destinations are malicious or not, based on whether (Continued)

responses to the probes sent out match the signatures generated or not.

8 Claims, 7 Drawing Sheets

| DATA ID | MALWARE ID | SESSION ID | PROTOCOL | TRANSMISSION SOURCE IP | TRANSMISSION DESTINATION IP | TRANSMISSION SOURCE PORT | TRANSMISSION DESTINATION PORT | PAYLOAD |
|---|---|---|---|---|---|---|---|---|
| 1 | M01 | a001 | TCP | 192.0.10.101 | 192.0.20.201 | 50000 | 80 | 101101001... |
| 2 | M01 | a001 | TCP | 192.0.20.201 | 192.0.10.101 | 80 | 50000 | 111101010... |
| 3 | M01 | a001 | TCP | 192.0.10.101 | 192.0.20.201 | 50000 | 80 | 111101110... |
| ... | | | | | | | | |
| 31 | M02 | b001 | TCP | 192.0.30.101 | 192.0.40.201 | 53000 | 20 | 101101001... |
| 32 | M02 | b001 | TCP | 192.0.40.501 | 192.0.30.101 | 80 | 53000 | 111101010... |
| 33 | M02 | b001 | TCP | 192.0.30.101 | 192.0.40.201 | 53000 | 20 | 111101110... |
| ... | | | | | | | | |
| 51 | M03 | | UDP | 192.0.50.101 | 192.0.60.201 | 55000 | 53 | 000000101... |
| 52 | M03 | | UDP | 192.0.60.201 | 192.0.50.101 | 53 | 55000 | 000010000... |
| 53 | M03 | | UDP | 192.0.50.101 | 192.0.60.201 | 55000 | 53 | 001100100... |
| ... | | | | | | | | |

Fig. 3

| REQUEST ID | RESPONSE ID | NUMBER OF DISCOVERIES | DEGREE OF RISK | DEGREE OF PRIORITY |
|---|---|---|---|---|
| 1 | 2 | 1 | 0.5 | 1.1 |
| 41 | 42 | 0 | 0.3 | 1.2 |
| 51 | 52 | 5 | 0.8 | 2.5 |
| ... | | | | |

SEARCH DEVICE, SEARCH METHOD, AND SEARCH PROGRAM

CROSS-REFERENCE TO RELATED APPLICATIONS

The present application is based on PCT filing PCT/JP2019/037895, filed Sep. 26, 2019, which claims priority to JP 2018-192103, filed Oct. 10, 2018, the entire contents of each are incorporated herein by reference.

TECHNICAL FIELD

The present invention relates to a search apparatus, a search method and a search program.

BACKGROUND ART

In a cyber attack, an attacker causes an arbitrary attack to be established, by operating a host infected with malware created by the attacker through a malicious server such as a C&C (command and control) server. As protective measures against such an attack, detection and interruption of communication using a blacklist of malicious servers are performed.

Further, as a method for searching for a malicious server to be put on the blacklist, a method is known in which a probe packet is sent out to the server, and whether the server is malicious or not is determined from a response to the probe packet (see, for example, Non-Patent Literature 1).

CITATION LIST

Non-Patent Literature

Non-Patent Literature 1: Antonio Nappa, Zhaoyan Xu, M. Zubair Rafique, Juan Caballero, and Guofei Gu. Cyber-Probe: Towards Internet-Scale Active Detection of Malicious Servers. Proceedings of NDSS, pp. 23-26, February 2014.

SUMMARY OF THE INVENTION

Technical Problem

However, prior-art techniques have a problem that there may be a case where it is not possible to efficiently perform search for malicious servers. Since an attacker prepares a plurality of servers and may avoid search by switching a used server in a short time, it is necessary to efficiently perform search and update a malicious server list. However, in some cases, it is not possible to perform efficient search by the prior-art techniques.

For example, in the method described in Non-Patent Literature 1, since narrowing down of candidates for malicious servers is not sufficient, it is conceivable that a probe packet cannot be immediately transmitted to a server that has started to be used as malicious, or that more probe packets are transmitted even to a server that is not malicious any more due to switching. Further, since the method described in Non-Patent Literature 1 adopts a scheme in which information in a header is referred to to generate a fingerprint, and importance is attached to a particular protocol, it becomes impossible to discover malicious servers that perform communication using other protocols including a protocol unique to malware. Therefore, in the method described in Non-Patent Literature 1, efficiency of search for malicious servers may decrease.

Means for Solving the Problem

In order to solve the problem described above and achieve an object, a search apparatus includes: processing circuitry configured to: extract fingerprints that are combinations of first communication data corresponding to requests and second communication data corresponding to responses to the requests, from communication data obtained by executing known malware; give degrees of priority corresponding to degrees of maliciousness of the malware, to the fingerprints; generate probes that are requests based on the first communication data included in the fingerprints and signatures based on the second communication data included in the fingerprints, independently from protocols; decide, based on information about communication of sending-out destinations, search-target sending-out destinations from among the sending-out destinations; send out the probes generated to the search-target sending-out destinations decided in order according to the degrees of priority given; and determine whether the search-target sending-out destinations are malicious or not, based on whether responses to the probes sent out match the signatures generated or not.

Effects of the Invention

According to the present invention, it is possible to efficiently perform search for malicious servers.

DESCRIPTION OF EMBODIMENTS

Embodiments of search apparatus, a search method and a search program according to the present application will be described in detail below based on drawings. Note that the present invention is not limited to the embodiments described below.

Configuration of First Embodiment

Figure 1:
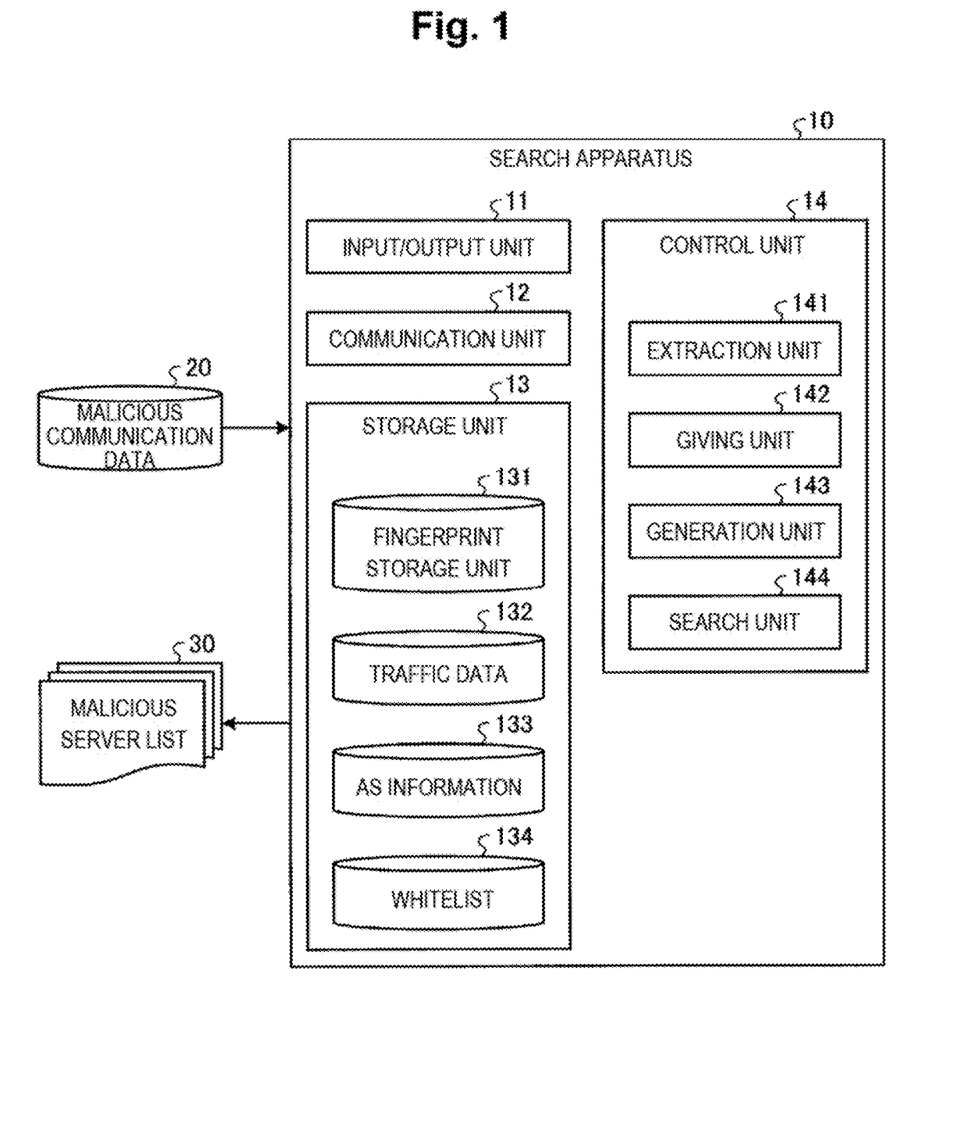
FIG. 1 is a diagram showing an example of a configuration of a search apparatus according to a first embodiment.

First, a configuration of a search apparatus according to a first embodiment will be described using FIG. 1. FIG. 1 is a diagram showing an example of a configuration of the search apparatus according to the first embodiment. As shown in FIG. 1, a search apparatus 10 has an input/output unit 11, a communication unit 12, a storage unit 13 and a control unit 14.

The input/output unit 11 receives input of data and performs output of data. For example, the input/output unit 11 includes input devices such as a mouse and a keyboard. Further, for example, the input/output unit 11 includes a display device such as a display. The communication unit 12 performs data communication with other apparatuses via a network. For example, the communication unit 12 is a NIC (network interface card).

The storage unit 13 is a storage device such as an HDD (hard disk drive), an SSD (solid state drive) and an optical disk. Note that the storage unit 13 may be a semiconductor memory on which data can be rewritten, such as a RAM (random access memory), a flash memory and an NVSRAM (non-volatile static random access memory). The storage unit 13 stores an OS (operating system) and various kinds of programs executed in the search apparatus 10. Furthermore, the storage unit 13 stores various kinds of information used for execution of the programs. Further, the storage unit 13 has a fingerprint storage unit 131. The storage unit 13 stores traffic data 132, AS information 133 and a whitelist 134.

Here, as shown in FIG. 1, the search apparatus 10 receives input of malicious communication data 20. The malicious communication data 20 is data of communication that occurs when known malware is executed in a sandbox environment. Further, the search apparatus 10 outputs a malicious server list 30. The malicious server list 30 is a list of malicious servers indicated by IP addresses or the like.

Figure 2:
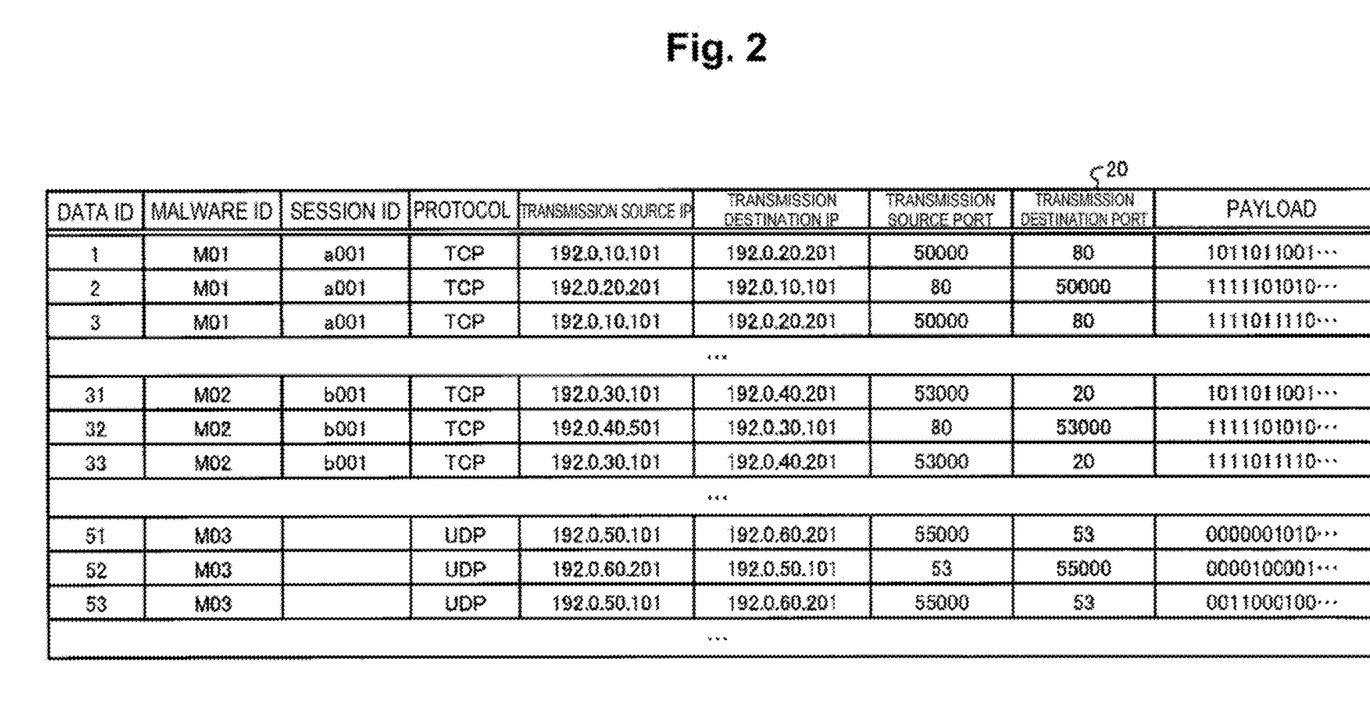
FIG. 2 is a diagram showing an example of malicious communication data according to the first embodiment.

For example, the malicious communication data 20 is headers and payloads of IP packet transmitted and received in communication. FIG. 2 is a diagram showing an example of malicious communication data according to the first embodiment. As shown in FIG. 2, "data ID", "malware ID", "session ID", "protocol", "transmission source IP", "transmission destination IP", "transmission source port", "transmission destination port", "payload" and the like are included in the malicious communication data 20.

Here, it is assumed that each record of the malicious communication data 20 of FIG. 2 corresponds to an IP packet. The "data ID" indicates an ID for identifying each record of the malicious communication data 20. The "malware ID" indicates an ID for identifying malware that caused an IP packet corresponding to each record to occur. The "session ID" indicates an ID for identifying a session in which each IP packet occurred. The "protocol" indicates a protocol of a transport layer of each IP packet. The "transmission source IP" indicates an IP address of a transmission source of each IP packet. The "transmission destination IP" indicates an IP address of a transmission destination of each IP packet. The "transmission source port" indicates a port number of a transmission source of each IP packet. The "transmission destination port" indicates a port number of a transmission destination of each IP packet. The "payload" indicates a payload of each IP packet.

For example, a record the "data ID" of which is "1" in FIG. 2 shows that malware the "malware ID" of which is "M01" caused an IP packet the "protocol" of which is "TCP", the "transmission source IP" of which is "192.0.10.101", the "transmission destination IP" of which is "192.0.20.201", the "transmission source port" of which is "50000", the "transmission destination port" of which is "80" and the "payload" of which is "1011011001 . . ." to occur in a session the "session ID" of which is "a001".

Figure 3:
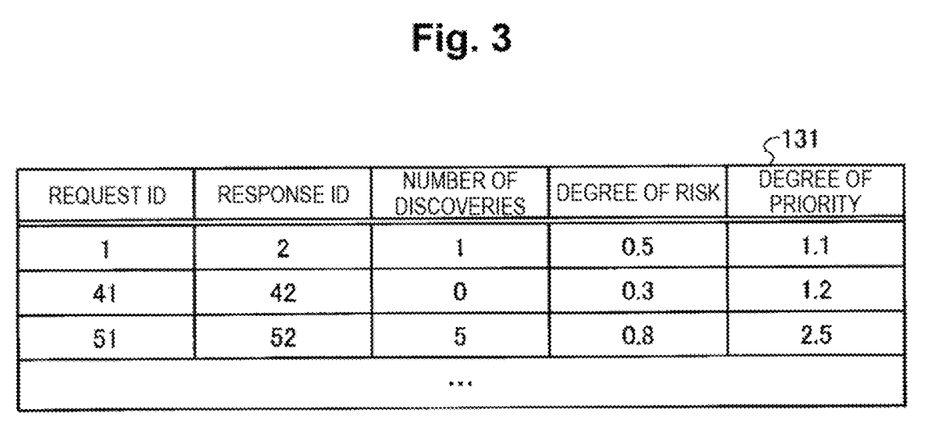
FIG. 3 is a diagram showing an example of fingerprints according to the first embodiment.

Here, fingerprints stored in the fingerprint storage unit 131 will be described using FIG. 3. FIG. 3 is a diagram showing an example of fingerprints according to the first embodiment. The fingerprints are combinations of communications that are in a request/response relationship in the malicious communication data 20.

As shown in FIG. 3, each fingerprint is identified by a "request ID" and a "response ID". Here, the "request ID" and the "response ID" correspond to a "data ID" in the malicious communication data 20. In other words, since a combination of the "request ID" and the "response ID" of a fingerprint on the first line in FIG. 3 is "1" and "2", the fingerprint is a combination of the IP packet the "data ID" of which is "1" and an IP packet the "data ID" of which is "2" in FIG. 2. Further, each of the "request ID" and the "response ID" may include a plurality of "data IDs".

For example, the record on the first line in FIG. 3 indicates such a fingerprint that the IP packet the "data ID" of which is "1" and the IP packet the "data ID" of which is "2" in the malicious communication data 20 are a request and a response, respectively.

"Number of discoveries" indicates the number of malicious servers discovered so far using the fingerprint. "Degree of risk" indicates a degree of risk of known malware that is a generation source of the fingerprint. "Degree of priority" indicates a degree of priority of the fingerprint. A method for giving the "degree of priority" will be described later.

The traffic data 132 is a communication log of a large-scale real network that is not a sandbox. The traffic data 132 includes information about transmission sources and transmission destinations of data in communication. For example, the traffic data 132 may be 5-tuple information about IP packets or may be statistical information such as communication volume for each flow. The AS (autonomous system) information 133 is information about a degree of maliciousness for each AS. The whitelist 134 is a list of servers that are known not to be malicious and is indicated by IP addresses or the like.

The control unit 14 controls the whole search apparatus 10. The control unit 14 is, for example, an electronic circuit such as a CPU (central processing unit) and an MPU (micro processing unit) or an integrated circuit such as an ASIC (application specific integrated circuit) and an FPGA (field programmable gate array). Further, the control unit 14 has an internal memory for storing programs defining various kinds of processing procedures and control data, and executes each process using the internal memory. Further, the control unit 14 functions as various kinds of processing units by the various kinds of programs operating. For example, the control unit 14 has an extraction unit 141, a giving unit 142, a generation unit 143 and a search unit 144.

The extraction unit 141 extracts fingerprints that are combinations of first communication data corresponding to requests and second communication data corresponding to responses to the requests, from communication data obtained by executing known malware.

For example, the extraction unit 141 acquires the fingerprint that is the combination of the record the "data ID" of which is "1" and the record the "data ID" of which is "2" in FIG. 2. At this time, the record the "data ID" of which is "1" is an example of the first communication data. Further, the record the "data ID" of which is "2" is an example of the second communication data. The record on the first line in FIG. 3 is an example of a fingerprint.

First, the extraction unit 141 collectively extracts request/response pairs that are combinations of the first communication data and the second communication data in predetermined units. Here, the extracted request/response pairs are candidates for fingerprints. For example, when the "protocol" in FIG. 2 is "TCP", the extraction unit 141 extracts combinations of the first communication data and the second communication data in session units. For example, when the "protocol" in FIG. 2 is "UDP", the extraction unit 141 extracts combinations of the first communication data and the second communication data in flow units.

Here, the flow unit is a unit of communication data whose "transmission source IP", "transmission destination IP", "transmission source port" and "transmission destination port" are the same. Further, the extraction unit 141 may collectively extract data of communication that occurs during a period until a predetermined time (for example, one second) or more passes between communications.

Further, the extraction unit 141 classifies such combinations that a transmission destination included in the first communication data is not listed on the whitelist 134 set beforehand, among the combinations of the first communication data and the second communication data, into a plurality of clusters, and extracts one or more fingerprints from each cluster. For example, when an IP address "192.0.40.201" is included in the whitelist 134, the extraction unit 141 does not extract a record the "data ID" of which is "31" in FIG. 2. Further, the extraction unit 141 performs the clustering based on values of each item of the malicious communication data 20, that is, header information and payloads of IP packets. By performing the clustering based on the payloads as described above, the extraction unit 141 can generate fingerprints that are not dependent on protocols.

The giving unit 142 gives degrees of priority corresponding to degrees of maliciousness of the malware, to the fingerprints. The giving unit 142 can give degrees of priority based on such "degrees of risk" of the fingerprints as shown in FIG. 3. The giving unit 142 gives the degrees of priority to the fingerprints so that the more the number of times of being determined to be malicious by the search unit 144 is, the higher a given degree of priority is. The determination process by the search unit 144 will be described later. In the example of FIG. 3, the giving unit 142 calculates the degrees of priority by a particular formula based on the "degrees of risk" and the "numbers of discoveries".

The generation unit 143 generates probes that are requests based on the first communication data included in the fingerprints and signatures based on the second communication data included in the fingerprints.

Here, the probes are assumed to be IP packets. At this time, for example, the generation unit 143 generates an IP packet the "transmission destination IP" of which is "192.0.20.201" and the "transmission destination port" of which is "80" as a probe, from the record the "data ID" of which is "1" in FIG. 2. The payload of the probe may be the payload itself of an IP packet corresponding to the first communication data, or may be such that is obtained by changing the payload of the IP packet corresponding to the first communication data.

Further, the generation unit 143 may cause a payload of an IP packet corresponding to the second communication data to be a signature. Further, the generation unit 143 may generate the signature by replacing a part of the payload of the IP packet corresponding to the second communication data with a regular expression.

Figure 4:
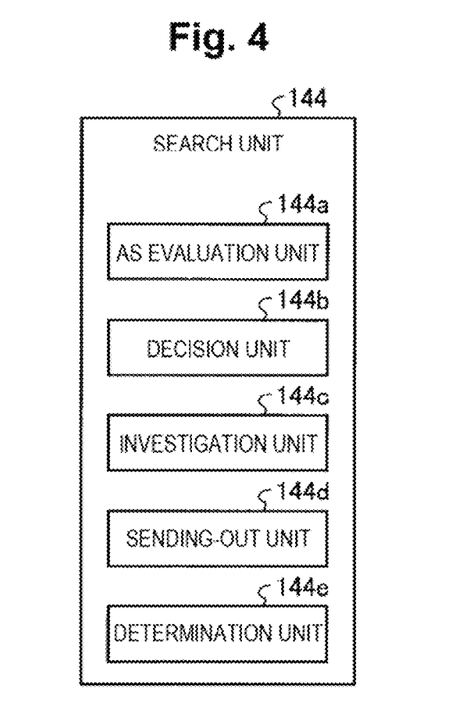
FIG. 4 is a diagram showing an example of a configuration of a search unit according to the first embodiment.

The search unit 144 performs search for malicious servers using the probes and the signatures. Further, the search unit 144 generates and outputs the malicious server list 30, which is a list of discovered malicious servers. Here, as shown in FIG. 4, the search unit 144 has an AS evaluation unit 144a, a decision unit 144b, an investigation unit 144c, a sending-out unit 144d and a determination unit 144e. FIG. 4 is a diagram showing an example of a configuration of a search unit according to the first embodiment. In the description below, servers that the search unit 144 sends out the probes may be merely called sending-out destinations.

The AS evaluation unit 144a evaluates a degree of maliciousness for each AS based on situations of discovery of malicious sending-out destinations. For example, the AS evaluation unit 144a may set the number of malicious servers for each AS as the degree of maliciousness, or may set a rate of malicious servers to the total number of servers for each AS as the degree of maliciousness. Further, it is assumed that the number of discoveries of malicious servers for each AS in the past is stored in the storage unit 13 as the AS information 133. Note that the AS information 133 may be such that is created based on information about malicious servers discovered by the search apparatus 10 or may be such that has been acquired from outside beforehand.

The decision unit 144b decides, based on information about communication of sending-out destinations, search-target sending-out destinations from among the sending-out destinations. For example, the decision unit 144b can decide sending-out destinations included in such AS's that a degree of maliciousness, which is evaluated for each AS by the AS evaluation unit 144a, is equal to or above a predetermined threshold, as the search-target sending-out destinations.

Figure 5:
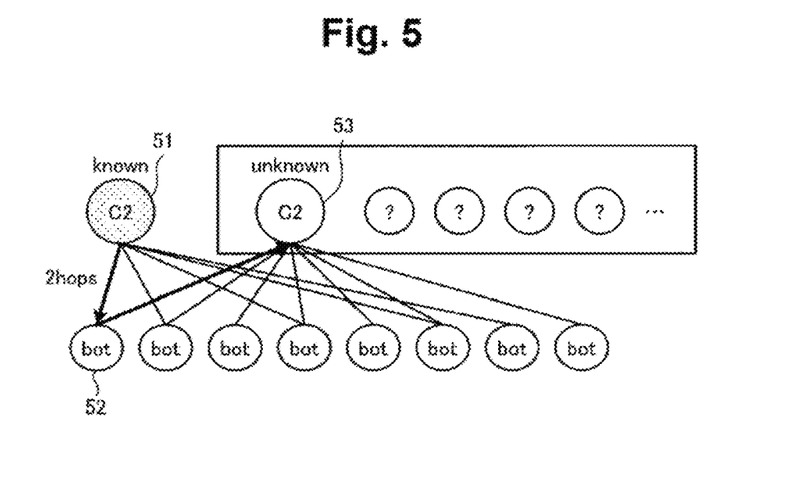
FIG. 5 is a diagram showing an example of a search-target server according to the first embodiment.

The decision unit 144b decides, based on the traffic data 132 collected from outside, a sending-out destination two hops ahead of a sending-out destination that is known to be malicious, as a search-target sending-out destination. FIG. 5 is a diagram showing an example of a search-target server according to the first embodiment. A server 51 in FIG. 5 is a C&C server and is a server that is known to be malicious.

Here, it is assumed that the traffic data 132 shows that communication is being performed between the server 51 and a server 52 on which bot is executed by malware. Furthermore, it is assumed that the traffic data 132 shows that communication is being performed between the server 52 and a server 53. In this case, since the server 53 is two hops ahead of the server 51, the decision unit 144b decides the server 53 as a search-target sending-out destination.

Further, the decision unit 144b may decide a range as a search target. For example, the decision unit 144b decides both one hop ahead of and two hops ahead of a sending-out destination known to be malicious, that is, a range within two hops ahead as a search range.

Further, the decision unit 144b may decide such a sending-out destination that the degree of maliciousness for each AS is equal to or above a predetermined threshold and that is two hops ahead of a sending-out destination known to be malicious, as a search-target sending-out destination. Further, the decision unit 144b may decide search order for the search-target sending-out destinations in descending order of the degree of maliciousness for each AS.

Furthermore, the decision unit 144b may refer to external information such as BGP (Border Gateway Protocol) route information to decide search targets and search order so that a prefix including a transmission destination IP address in the malicious communication data 20 or other IP addresses held by organizations that hold transmission destination IP addresses in the malicious communication data 20 are preferentially searched for.

The investigation unit 144c investigates whether ports of sending-out destinations of the probes are open or not. For example, the investigation unit 144c can investigate the ports of the sending-out destinations using an existing port scanning technique.

The sending-out unit 144d sends out the probes generated by the generation unit 143 to the search-target sending-out destinations decided by the decision unit 144b in order according to the degrees of priority given by the giving unit 142. Further, if the search order has been decided by the decision unit 144b, the sending-out unit 144d sends out the probes generated by the generation unit according to the search order.

If it has been known by investigation by the investigation unit 144c that a port of a sending-out destination of a probe is not open, the sending-out unit 144d can, without sending out the probe, proceed to the sending-out process of the next probe.

The determination unit 144e determines whether the search-target sending-out destinations are malicious or not, based on whether responses to the probes sent out by the sending-out unit 144d match the signatures generated by the generation unit 143 or not. For example, the determination unit 144e may determine that a response matches a signature if the payload of the IP packet of the response completely or partially corresponds to the signature. Further, the determination unit 144e may determine that a response matches a signature if a degree of correspondence between the payload of the IP packet of the response and the signature is equal to or above a threshold.

Process of First Embodiment

Figure 6:
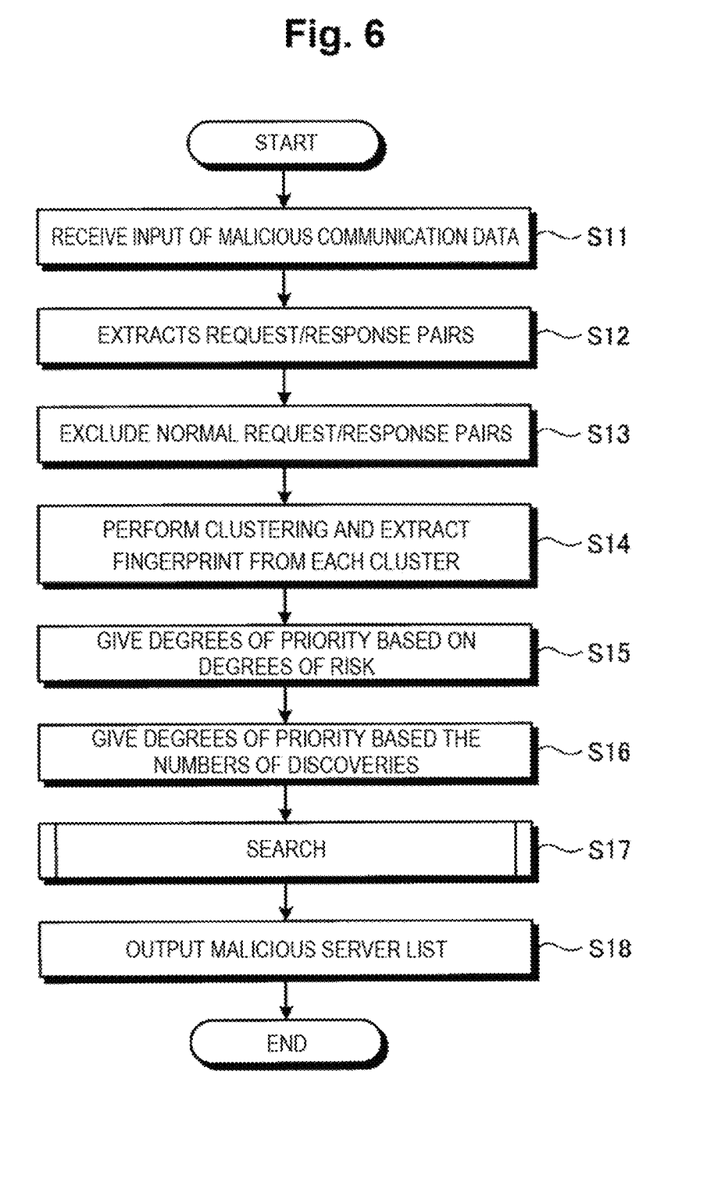
FIG. 6 is a flowchart showing a flow of the whole process of the search apparatus according to the first embodiment.

A flow of a process of the search apparatus 10 will be described using FIG. 6. FIG. 6 is a flowchart showing a flow of the whole process of the search apparatus according to the first embodiment. As shown in FIG. 6, the search apparatus 10 receives input of the malicious communication data 20 (step S11). Next, the search apparatus 10 extracts request/response pairs from the malicious communication data 20 (step S12).

Here, the search apparatus 10 excludes normal request/response pairs (step S13). Note that the normal request/response pairs are request/response pairs the transmission destinations of which are included are included in the whitelist 134 among the extracted request/response pairs. Then, the search apparatus 10 performs clustering of the request/response pairs and extracts fingerprints from the clusters (step S14).

Then, the search apparatus 10 gives a degree of priority based on a degree of risk of each fingerprint (step S15) and the number of discoveries (step S16). Here, the search apparatus 10 performs a search process (step S17) and outputs the malicious server list 30 on which a result of the search process is reflected (step S18).

Figure 7:
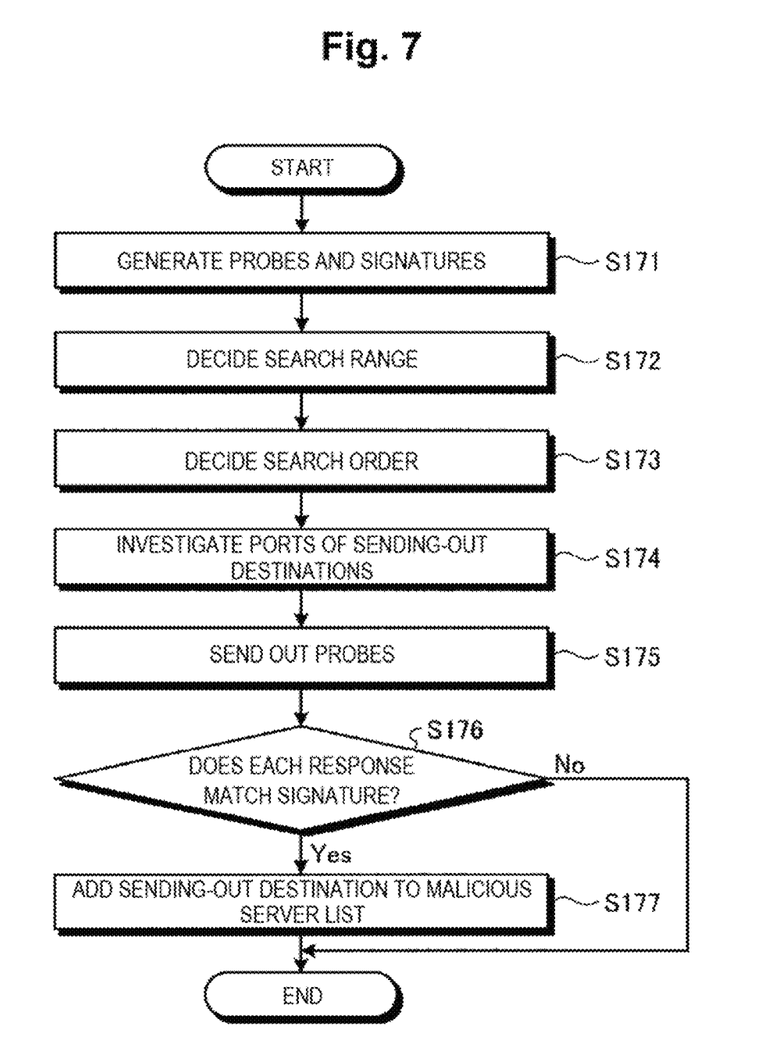
FIG. 7 is a flowchart showing a flow of a search process according to the first embodiment.

The search process by the search apparatus 10 will be described using FIG. 7. FIG. 7 is a flowchart showing a flow of a search process according to the first embodiment. Further, the search process is a process corresponding to step S17 in FIG. 6.

First, the search apparatus 10 generates probes and signatures from fingerprints as shown in FIG. 7 (step S171). Next, the search apparatus 10 decides a server search range (step S172). Further, the search apparatus 10 decides server search order (step S173). Then, the search apparatus 10 investigates whether ports of sending-out destinations are open or not (step S174).

Then, the search apparatus 10 sends out the probes to the sending-out destinations (step S175). At this time, the search apparatus 10 determines whether a response to each of the sent-out probes matches a corresponding signature or not (step S176). If the response matches the signature (step S176: Yes), the search apparatus 10 adds the sending-out destination to the malicious server list 30 (step S177). On the other hand, if the response does not match the signature (step S176: No), the search apparatus 10 does not add the sending-out destination to the malicious server list 30 and ends the process. If a response is not returned after a probe is sent out at step S175 (for example, if timeout occurs), the search apparatus 10 ends the process without adding the sending-out destination to the malicious server list 30 similarly to the case where a response does not match a signature.

Effects of First Embodiment

As described so far, the search apparatus 10 extracts fingerprints that are combinations of first communication data corresponding to a request and second communication data corresponding to a response for the request, from communication data obtained by executing known malware. Further, the search apparatus 10 gives degrees of priority to the fingerprints according to degrees of maliciousness of malware. Further, the search apparatus 10 decides search-target sending-out destinations from among sending-out destinations, based on information about communication of the sending-out destinations. Further, the search apparatus 10 generates a probe which is a request based on the first communication data included in each fingerprint and a signature based on the second communication data included in the fingerprint. Further, the search apparatus 10 sends out the probes to the decided search-target sending-out destinations in order according to the given degrees of priority. Further, the search apparatus 10 determines whether the search-target sending-out destinations are malicious or not, based on whether responses to the sent-out probes match the signatures or not.

Thus, the search apparatus 10 gives priority to search by a fingerprint that is highly likely to discover a malicious server, and causes servers that are highly likely to be malicious to be search targets. Therefore, according to the search apparatus 10, it is possible to efficiently perform search for malicious servers.

In the method described in Non-Patent Literature 1, for example, a signature in conformity with a particular protocol like HTTP is generated. In comparison, the search apparatus 10 can generate a fingerprint without depending on protocols, and it is possible to enhance efficiency of search for malicious servers.

Further, the search apparatus 10 classifies such combinations that a transmission destination included in the first communication data is not listed on the whitelist 134 set beforehand, among combinations of the first communication data and the second communication data, into a plurality of clusters based on payloads, and extracts fingerprints from the clusters independently from protocols. Thereby, it is possible to exclude servers that are clearly not malicious from search targets and enhance efficiency of search.

The search apparatus 10 gives the degrees of priority to the fingerprints so that the more the number of times of being determined to be malicious is, the higher a given degree of priority is. Thereby, it is possible to give priority to search by a fingerprint that is highly likely to discover a malicious server, based on past results.

Further, the search apparatus 10 decides, based on the traffic data 132 collected from outside, a sending-out destination two hops ahead of a sending-out destination that is known to be malicious, as a search-target sending-out destination. Thereby, it is possible to cause a server that is highly likely to be malicious to be a search target. Especially, there is a possibility that, two hops ahead of a C&C server which is a malicious server, another malicious server which is a communication destination of a client infected with malware exists.

Further, the search apparatus 10 decides sending-out destinations included in such AS's that a degree of maliciousness, which is determined for each AS based on situations of discovery of malicious sending-out destinations, is equal to or above a predetermined threshold, as the search-target sending-out destinations. Thereby, it is possible to cause an AS where it is anticipated that many malicious servers exist to be a search target.

Further, the search apparatus 10 decides search order for search-target sending-out destinations in descending order of the degree of maliciousness of the AS's. At this time, the search apparatus 10 sends out the probes according to the search order. Thereby, it becomes possible to discover a malicious server earlier.

[System Configuration and the Like]

Each component of each apparatus shown in the drawings is functionally conceptual and is not necessarily required to be physically configured as shown in the drawings. In other words, a specific form of distribution and integration of each apparatus is not limited to what is shown in the drawings. A configuration can be made by functionally or physically distributing or integrating all or a part of the form in arbitrary units according to various kinds of loads, use situations and the like. Furthermore, as for each processing function performed in each apparatus, all or an arbitrary part of the processing function can be realized by a CPU and a program analyzed and executed by the CPU or can be realized as hardware by a wired logic.

Further, all or a part of a process described as being automatically performed, among the processes described in the present embodiment, can be manually performed, or all or a part of a process described as being manually performed can be automatically performed in a publicly known method. Additionally, the process procedures, control procedures, specific names and information including various kinds of data and parameters, which are shown in the above document and drawings, can be changed unless otherwise stated.

[Program]

As one embodiment, the search apparatus 10 can be implemented by causing a search program that executes the search for malicious servers described above as package software or online software to be installed into a desired computer. For example, by causing an information processing apparatus to execute the above search program, it is possible to cause the information processing apparatus to function as the search apparatus 10. As the information processing apparatus stated here, a desktop or notebook personal computer is included. In addition, a smartphone, a mobile communication terminal such as a mobile phone and a PHS (personal handy-phone system) and, furthermore, a slate terminal and the like such as a PDA (personal digital assistant) are included in the category of information processing apparatus.

Further, the search apparatus 10 can be implemented as a search server apparatus that, with a terminal apparatus used by a user as a client, provides a service related to the search for malicious servers described above for the client. For example, the search server apparatus is implemented as a server apparatus that provides a search service, with malicious communication data as an input and with a malicious server list as an output. In this case, the search server apparatus may be implemented as a web server or may be implemented as a cloud that provides the service related to the search for malicious servers described above by outsourcing.

Figure 8:
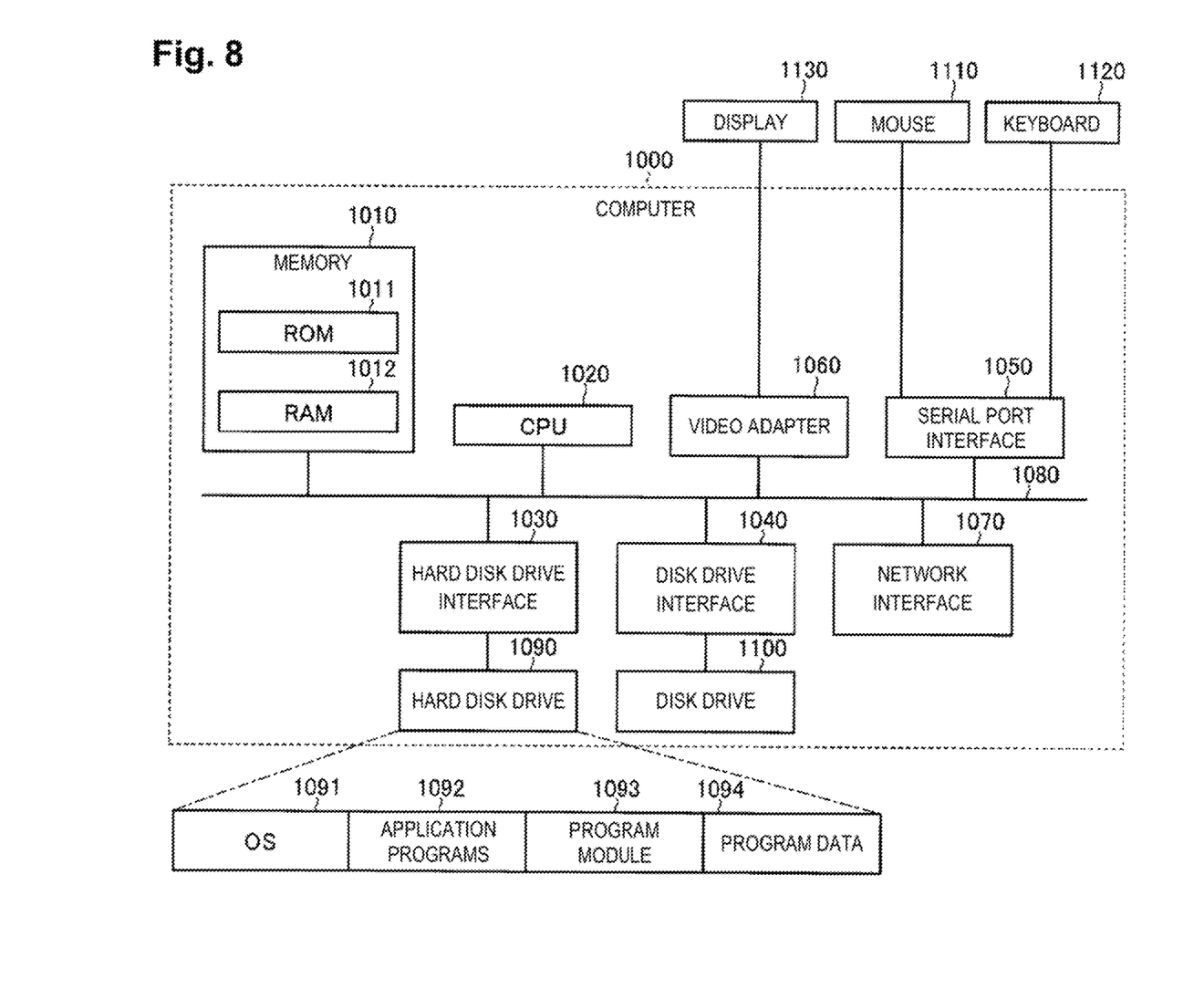
FIG. 8 is a diagram showing an example of a computer that executes a search program.

FIG. 8 is a diagram showing an example of a computer that executes a search program. A computer 1000 has, for example, a memory 1010 and a CPU 1020. Further, the computer 1000 has a hard disk drive interface 1030, a disk drive interface 1040, a serial port interface 1050, a video adapter 1060 and a network interface 1070. These units are connected via a bus 1080.

The memory 1010 includes a ROM (read-only memory) 1011 and a RAM 1012. The ROM 1011 stores, for example, a boot program such as BIOS (basic input/output system). The hard disk drive interface 1030 is connected to a hard disk drive 1090. The disk drive interface 1040 is connected to a disk drive 1100. For example, a removable storage medium such as a magnetic disk and an optical disk is inserted into the disk drive 1100. The serial port interface 1050 is connected, for example, to a mouse 1110 and a keyboard 1120. The video adapter 1060 is connected, for example, to a display 1130.

The hard disk drive 1090 stores, for example, an OS 1091, application programs 1092, a program module 1093 and program data 1094. In other words, a program that defines each process of the search apparatus 10 is implemented as the program module 1093 in which computer-executable codes are defined. The program module 1093 is stored, for example, in the hard disk drive 1090. For example, the program module 1093 for executing processes similar to the processes of the functional components in the search apparatus 10 is stored in the hard disk drive 1090. Note that an SSD may be substituted for the hard disk drive 1090.

Further, setting data used in the processes in the embodiment described above is stored, for example, in the memory 1010 or the hard disk drive 1090 as the program data 1094. The CPU 1020 reads out the program module 1093 and the program data 1094 stored in the memory 1010 and the hard disk drive 1090 onto the RAM 1012 as necessary and executes the processes of the embodiment described above.

Note that the program module 1093 and the program data 1094 are not limited to the case of being stored in the hard disk drive 1090, but may be stored, for example, in a removable storage medium and read out by the CPU 1020 via the disk drive 1100 or the like. Or alternatively, the program module 1093 and the program data 1094 may be stored in another computer connected via a network (such as a LAN (local area network) and a WAN (wide area network)). Then, the program module 1093 and the program data 1094 may be read out from the other computer by the CPU 1020 via the network interface 1070.

REFERENCE SIGNS LIST

10 Search apparatus
11 Input/output unit
12 Communication unit
13 Storage unit
14 Control unit
20 Malicious communication data
30 Malicious server list
131 Fingerprint storage unit
132 Traffic data
133 AS information
134 Whitelist
141 Extraction unit
142 Giving unit
143 Generation unit 144 Search unit
144a AS evaluation unit
144b Decision unit
144c Investigation unit
144d Sending-out unit
144e Determination unit

The invention claimed is:

1. A search apparatus comprising:
processing circuitry configured to:
extract fingerprints that are combinations of first communication data corresponding to requests and second communication data corresponding to responses to the requests, from communication data obtained by executing known malware;
give degrees of priority corresponding to degrees of maliciousness of the malware, to the fingerprints;
generate probes that are requests based on the first communication data included in the fingerprints and signatures based on the second communication data included in the fingerprints;
decide, based on information about communication of sending-out destinations, search-target sending-out destinations from among the sending-out destinations;
send out the probes generated to the search-target sending-out destinations decided in an order based on the degrees of priority given; and
determine whether the search-target sending-out destinations are malicious or not, based on whether responses to the probes sent out match the signatures generated or not.

2. The search apparatus according to claim 1, wherein the processing circuitry is further configured to classify such combinations that a transmission destination included in the first communication data is not listed on a whitelist set beforehand, among the combinations of the first communication data and the second communication data, into a plurality of clusters based on payloads, and extract the fingerprints from the clusters independently from protocols.

3. The search apparatus according to claim 1, wherein the processing circuitry is further configured to give the degrees of priority to the fingerprints so that the more a number of times of being determined to be malicious is, the higher a given degree of priority is.

4. The search apparatus according to claim 1, wherein is the processing circuitry is further configured to decide, based on traffic data collected from outside, a sending-out destination two hops ahead of a sending-out destination that is known to be malicious, as a search-target sending-out destination.

5. The search apparatus according to claim 1, wherein the processing circuitry is further configured to decide sending-out destinations included in such autonomous systems (AS's) that a degree of maliciousness, which is determined for each AS based on situations of discovery of malicious sending-out destinations, is equal to or above a predetermined threshold, as the search-target sending-out destinations.

6. The search apparatus according to claim 5, wherein the processing circuitry is further configured to:
decide search order for search-target sending-out destinations in descending order of the degrees of maliciousness of the AS's, and
send out the probes generated according to the search order.

7. A search method executed by a computer, the search method comprising:
extracting fingerprints that are combinations of first communication data corresponding to requests and second communication data corresponding to responses to the requests, from communication data obtained by executing known malware;
giving degrees of priority corresponding to degrees of maliciousness of the malware, to the fingerprints;
generating probes that are requests based on the first communication data included in the fingerprints and signatures based on the second communication data included in the fingerprints;
deciding, based on information about communication of sending-out destinations, search-target sending-out destinations from among the sending-out destinations;
sending out the probes generated at the generating to the search-target sending-out destinations decided at the deciding in an order based on the degrees of priority given at the giving; and
determining whether the search-target sending-out destinations are malicious or not, based on whether responses to the probes sent out at the sending out match the signatures generated at the generating or not.

8. A non-transitory computer-readable recording medium storing therein a search program that causes a computer to execute a process comprising:
extracting fingerprints that are combinations of first communication data corresponding to requests and second communication data corresponding to responses to the requests, from communication data obtained by executing known malware;
giving degrees of priority corresponding to degrees of maliciousness of the malware, to the fingerprints;
generating probes that are requests based on the first communication data included in the fingerprints and signatures based on the second communication data included in the fingerprints;
deciding, based on information about communication of sending-out destinations, search-target sending-out destinations from among the sending-out destinations;
sending out the probes generated at the generating to the search-target sending-out destinations decided at the deciding in an order based on the degrees of priority given at the giving;
and determining whether the search-target sending-out destinations are malicious or not, based on whether responses to the probes sent out at the sending out match the signatures generated at the generating or not.

* * * * *